Oct. 22, 1935.  J. BLACKBURN  2,017,887
CABLE CLAMP OR CONNECTER
Filed Nov. 1, 1933

INVENTOR
JASPER BLACKBURN
By Adam E. Fisher
ATTORNEY

Patented Oct. 22, 1935

2,017,887

UNITED STATES PATENT OFFICE 2,017,887

CABLE CLAMP OR CONNECTER

Jasper Blackburn, Webster Groves, Mo.

Application November 1, 1933, Serial No. 696,193

1 Claim. (Cl. 24—126)

This invention relates to clamps, splicers or connecters for use in joining or connecting the ends of wire cables or the like, such as the three-ply wire cables commonly used in the installation of telephone and telegraph lines, or in the erection of highway guards, or similar structures.

The prime object of the invention is to provide in novel form, a simple and efficient clamp for the purposes referred to, the same including an elongated link having an opening extended axially therethrough, the opening being straightly angular in cross section and tapered from end to end, thus providing a socket, receptacle or cable-way for the inserted end of the multi-ply or multi-strand cable, the several twisted or helical strands of which may be automatically straightened and spread asunder into the corners of the socket through the mere act of inserting the cable end into the socket through the small opening thereof and then twisting the cable reversely to its winding, and a wedge formed to fit complementarily into the socket of the link, between the parted strands of the cable, and whereby those strands may be forced, pinched and locked in place within their respective corners, the complemental formation of the wedge serving also to facilitate its proper installation and positioning within the socket.

Another object is to provide a clamp or connecter of the kind described, the same including a link having an elongated opening therethrough, the opening being angular in cross section and tapered from end to end, thus forming a socket, receptacle or cable-way for the end of a multi-ply cable, the angular disposition of the walls of the socket serving to automatically straighten and spread asunder the several strands of the cable end inserted through the small end of the socket, as the cable is twisted in the proper direction, and to position those strands severally into corners of the socket, and a wedge formed to fit complementarily into the said socket and between the parted strands of the cable for pinching and locking the strands within said corners, the complemental formation of the wedge facilitating its proper insertion and positioning, there being a sight aperture formed through one wall of the link into the socket, to enable the operator to easily inspect the arrangement and positioning of the elements, and means at the larger end of the socket for engaging the end of a take-up bar.

Another object is to provide a clamp of the kind referred to, the same including a link having an angular socket formed therein for the reception of the parted ends of a multi-ply cable, which said ends may be positioned separately into the angles or corners of the socket, and a complemental wedge for seating in the socket against the strands, for forcing the latter into the said socket angles.

With these and such other objects and advantages in view as may be developed in the following specification, attention is now directed to the accompanying drawing as constituting a part of the specification, the same exemplifying certain preferred embodiments of the invention, and wherein Figure 1 is an elevation showing three of the connecters in use, two being joined by a take-up bar, and thus used as a splice for two cable ends, and the other being used for engaging the opposite end of the cable, in combination with a take-up bar passed through a post. A medial section of cable is represented as broken out.

Figure 1:
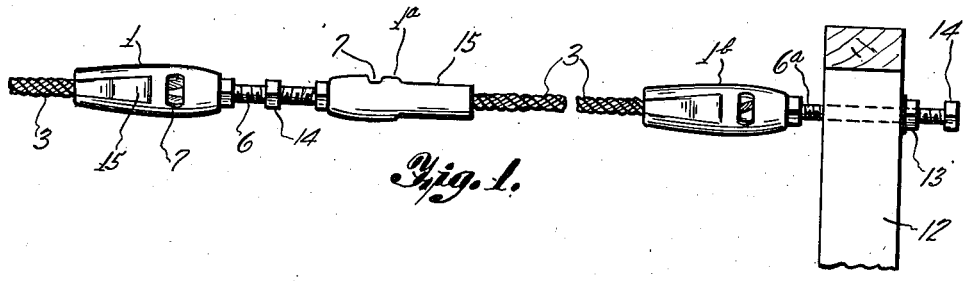
Figures 2, 3:
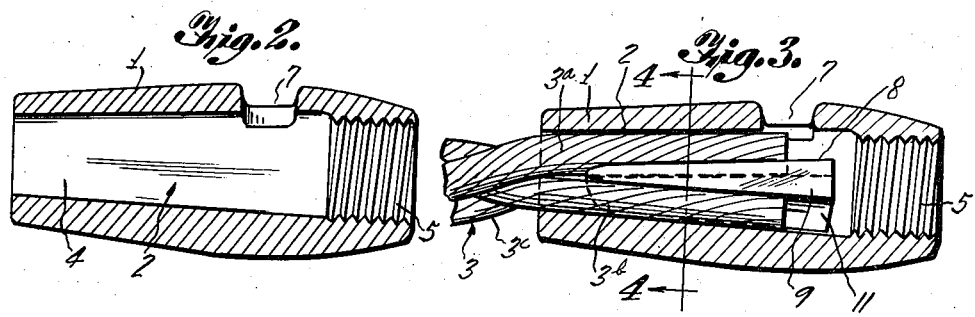
Figure 2 is a longitudinal section on an enlarged scale through a preferred form of a link constructed in accordance with my invention.
Figure 3 is a view similar to that of Figure 2, showing the insertion of the end of the three-ply cable into the socket of the link, the strands of the cable being parted and located in the corners of the socket, and a complemental wedge being inserted in the socket between the parted strands of the cable for locking same in place.

As shown in Figures 1 to 5, the invention comprises an elongated link 1 formed with an opening 2 extended axially clear through the link from end to end, this opening being straightly triangular in cross section to correspond with the three-ply cable 3 upon which it is designed for use, and thus providing a separate corner or angle for each strand and within which it may be pinched and locked. This opening 3 is tapered from end to end, as shown, and forms at the smaller end a socket or receptacle 4 for one end of the cable which is to be inserted into the socket through this end, as represented in Figures 1 and 3. At the opposite and larger end of the opening, the walls thereof are turned and tapped, as shown at 5, for the engagement of the threaded end of a take-up rod 6 or 6a. A sight aperture or peep-hole 7 is formed through one side of the link and communicates with the opening 2, whereby an operator is enabled to view the interior arrangement and adjustment of the elements. A wedge 8 is provided, the same being generally triangular in cross section and tapered from end to end complementarily to the form of the socket 4, the wedge having tapered side faces 9 adapted to align with the corresponding inner faces 10 of the socket, the corners of the wedge being cut away on concaved lines, as shown at 11, to accommodate the three cable strands 3a, 3b, 3c, which in the use of the device are straightened and spread asunder and locked one in each corner or angle 10a of the triangular socket, as already referred to and as clearly shown in Figure 4.

Figures 4, 5:
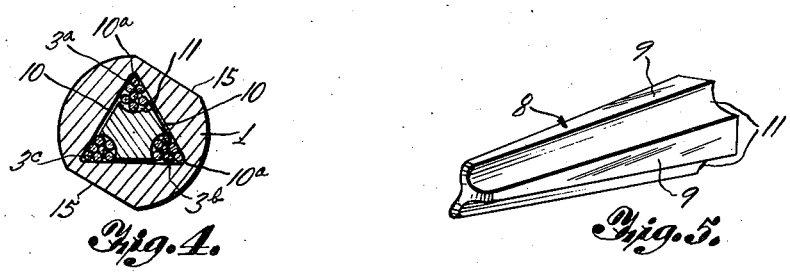
Figure 4 is a transverse section on the line 4—4 of Figure 3.
Figure 5 is a detail of the wedge, on the scale represented in Figure 4.

In the use of the clamp or connecter as described, the cable end 3 is inserted well into the socket through the smaller end thereof, as shown in Figure 3. By then twisting the cable reversely to the normal turn or lay of the strands, these strands 3a, 3b, 3c come into contact with the faces 10 of the socket and are caused automatically to straighten and spread asunder and enter each into a separate corner of the socket, as represented in Figure 4. The wedge 8 is then passed through the tapped end 5 of the opening 2, and is inserted between the parted strands of the cable, as shown in Figure 3, the side faces 9 of the wedge being properly aligned with the corresponding faces 10 of the socket. This operation and alignment is facilitated both by the complemental formation of the wedge, whereby the wedge tends to automatically adjust itself to its seat, and by the peep-hole 7, through which the operator may readily inspect the adjustment of the elements. The wedge being then driven home with a hammer, or in any conventional manner, the several strands 3a, 3b, 3c, are severally crowded, pinched and locked in place within their respective corners of the socket, the converging sides thereof conducing effectually to this purpose and result. The peep-hole 7 also enables the operator to insert the cable end just the right distance into the socket and without encroaching upon or penetrating the tapped end 5, which should be left free for the engagement of a take-up rod or bar 6 or 6a.

The use and operation of the clamps, with or without the take-up rods 6 and 6a, is apparent from an inspection of Figure 1. The rod 6 is provided at its ends with reversed threads for engaging the correspondingly threaded ends 5 of the two reversed clamps or links 1 and 1a. The rod 6a engages at one end the clamp 1b, the opposite end being passed through a post 12 and provided with the nut 13 at the outer side of the post. The cable ends 3 being properly locked within the clamps in manner already pointed out, the heads 14 of the rods may be turned with a wrench as desired for tightening or loosening the cables. The link 1 may be faced as shown at 15 to facilitate the use of a wrench thereupon.

Figures 6, 7:
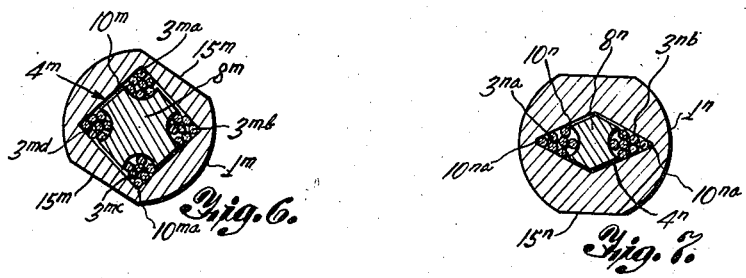
Figure 6 is a transverse section of a modified form of the invention, for accommodating a four-ply form of cable.
Figure 7 is a transverse section of still another modified form of the invention, for use upon two-ply cables.

Figure 6 shows a modified form of the clamp 1m, as adaptable for use upon a four-ply cable having the strands 3ma, 3mb, 3mc, 3md. For this purpose the socket 4m is made rectangular instead of triangular, and the wedge 8m is made complemental thereto. Figure 7 shows another modification 1n, designed for use upon a two-ply cable having the strands 3na, 3nb. In this form, the socket 4n is diamond shaped and provides two corners or angles 10na for the engagement of the two strands 3na and 3nb. The use and operation of the forms of Figures 6 and 7 are essentially the same as for the first described or triangular form. These several forms are all based upon the cross-sectional angularity of the sockets, whereby corners or angles are provided for the reception of the separated strands of the cable, and within which corners or angles those strands may be pinched and locked against movement through the action of the wedges. In actual practice and use, the forms described are found to be very effective for the purposes referred to.

I claim:

In a clamp for use upon the end of a three strand cable and comprising a link having a tapered socket triangular in cross-section extended straightly therethrough and a complemental wedge for locking the separated strand ends each into a separate angle of the socket, the provision of a peep-hole through one wall of the link adjacent the larger end of the socket of the link, the said peep-hole communicating with the socket for facilitating the adjustment of the separated strand ends into and relative to the angles of the socket and of the wedge relative to the strand ends.

JASPER BLACKBURN.